US011669337B2

(12) United States Patent
Bilal et al.

(10) Patent No.: US 11,669,337 B2
(45) Date of Patent: \*Jun. 6, 2023

(54) BARE METAL DEVICE MANAGEMENT

(71) Applicant: VMware, Inc., Palo Alto, CA (US)

(72) Inventors: Ahmad Bilal, Renton, WA (US);
Alexey Polyakov, Palo Alto, CA (US);
Tomas Vetrovsky, Bellevue, WA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,580

(22) Filed: Mar. 4, 2022

(65) Prior Publication Data
US 2022/0318023 A1    Oct. 6, 2022

Related U.S. Application Data

(63) Continuation of application No. 17/095,176, filed on Nov. 11, 2020, now Pat. No. 11,269,655, which is a
(Continued)

(51) Int. Cl.
*G06F 9/4401* (2018.01)
*G06F 21/44* (2013.01)
*G06F 21/57* (2013.01)

(52) U.S. Cl.
CPC .......... *G06F 9/4406* (2013.01); *G06F 9/4401* (2013.01); *G06F 9/4416* (2013.01); *G06F 21/44* (2013.01); *G06F 21/57* (2013.01)

(58) Field of Classification Search
CPC .... G06F 9/4401; G06F 9/4406; G06F 9/4408; G06F 9/441; G06F 9/4416; G06F 21/44; G06F 21/45; G06F 21/57; G06F 21/575
See application file for complete search history.

(56) References Cited

U.S. PATENT DOCUMENTS 7,836,293 B1 * 11/2010 Wynia ................. G06F 9/4405
713/1
8,996,667 B2    3/2015 Clerc
(Continued)

FOREIGN PATENT DOCUMENTS

KR    2018-0083820    7/2018
WO    WO2013165811    7/2013

OTHER PUBLICATIONS

International Search Report dated Nov. 18, 2019 for International Application No. PCT/US2019/043807.

*Primary Examiner* — Thomas J. Cleary
(74) *Attorney, Agent, or Firm* — Clayton, McKay & Bailey, PC

(57) ABSTRACT

Examples described herein include systems and methods for bare metal management of computing devices. Firmware of the computing device can be configured to contact a network location as part of an HTTP boot and download a boot agent. The boot agent can be prioritized to execute before a primary OS boot loader. The boot agent can download an OS configuration including a package that is inserted into the primary OS. The primary OS, as configured, can then boot. The boot agent can also attest to OS health and device compliance on subsequent boots. For example, the boot agent can cause the firmware to track how many boots have occurred since compliance verification. If a threshold number of boots occur without verification, the boot agent can initiate restoration. Alternatively, if a decommission flag is set, the boot agent can cause the computing device to boot into its original configuration.

17 Claims, 7 Drawing Sheets

Related U.S. Application Data continuation of application No. 16/046,325, filed on Jul. 26, 2018, now Pat. No. 10,838,736.

(56) References Cited

U.S. PATENT DOCUMENTS

| | | | |
|---|---|---|---|
| 9,292,312 B2 | 3/2016 | Bealkowski | |
| 9,928,082 B1* | 3/2018 | Huynh Van | H04L 67/34 |
| 10,003,554 B1* | 6/2018 | Zidenberg | H04L 49/25 |
| 10,372,463 B1 | 8/2019 | Twomey | |
| 10,402,290 B2 | 9/2019 | Tumkur | |
| 10,419,486 B1* | 9/2019 | Portner | H04L 63/1416 |
| 10,838,736 B2 | 11/2020 | Bilal | |
| 11,269,655 B2* | 3/2022 | Bilal | G06F 21/44 |
| 2004/0064457 A1* | 4/2004 | Zimmer | G06F 21/575 |
| 2005/0071623 A1 | 3/2005 | Goud | |
| 2005/0204353 A1* | 9/2005 | Ji | G06F 8/658 |
| | | | 717/168 |
| 2006/0031668 A1 | 2/2006 | Miyamoto | |
| 2006/0206702 A1* | 9/2006 | Fausak | G06F 9/4416 |
| | | | 713/2 |
| 2006/0230165 A1 | 10/2006 | Zimmer | |
| 2007/0260868 A1* | 11/2007 | Azzarello | G06F 9/4406 |
| | | | 713/2 |
| 2008/0155245 A1 | 6/2008 | Lipscombe | |
| 2009/0319766 A1 | 12/2009 | Ward | |
| 2009/0320012 A1* | 12/2009 | Lee | G06F 8/65 |
| | | | 714/758 |
| 2012/0151223 A1 | 6/2012 | Conde Marques | |
| 2013/0290694 A1* | 10/2013 | Civilini | H04L 41/0806 |
| | | | 713/2 |
| 2014/0032889 A1 | 1/2014 | Koenen | |
| 2014/0059541 A1* | 2/2014 | Heninger | G06F 9/45545 |
| | | | 718/1 |
| 2014/0089652 A1 | 3/2014 | Cerri | |
| 2014/0172783 A1 | 6/2014 | Suzuki | |
| 2015/0089645 A1* | 3/2015 | Vandergeest | G06F 21/55 |
| | | | 726/23 |
| 2017/0228237 A1* | 8/2017 | Ponnusamy | G06F 9/4416 |
| 2017/0235928 A1* | 8/2017 | Desai | G06F 21/572 |
| | | | 713/2 |
| 2018/0276002 A1* | 9/2018 | Roszak | G06F 9/4416 |
| 2019/0213820 A1* | 7/2019 | Sebes | G07C 13/00 |
| 2019/0391816 A1 | 12/2019 | Lin | |
| 2021/0240832 A1* | 8/2021 | Malluru | G06F 21/602 |
| 2021/0271523 A1* | 9/2021 | Parthasarathy | G06F 11/1464 |
| 2021/0294772 A1* | 9/2021 | Srivastava | G06F 15/7807 |
| 2022/0004636 A1* | 1/2022 | Walker | G06F 21/572 |

\* cited by examiner

BARE METAL DEVICE MANAGEMENT

This application claims priority to and is a continuation of U.S. patent application Ser. No. 17/095,176, titled "Bare Metal Device Management," filed Nov. 11, 2020, which is a continuation of U.S. patent application Ser. No. 16/046,325, titled "Bare Metal Device Management," filed Jul. 26, 2018, both of which are incorporated by reference herein in their entireties.

BACKGROUND

However, management typically begins after the computing device has booted. Enrollment traditionally cannot occur until the device is already in use. Preliminary provisioning is difficult because it requires an administrator to enroll each device for management prior to the user having access to the device. Normally, a user must elect to enroll with the EMM. Even after doing so, users could still potentially boot the computing device into an OS with a noncompliant configuration that either does not implement the management agent or could attempt to modify code used by the management agent to enforce compliance prior to boot.

Administrators also struggle to track ownership or configurations of many types of non-APPLE computing devices. Each computing device can include a different combination of hardware and software from multiple vendors. There is no central entity or repository that tracks ownership and configuration information, unlike in the APPLE ecosystem. As a result, administrators do not know how to boot computing devices into a managed configuration.

Additionally, outside of the APPLE ecosystem, there is no easy way for an original equipment manufacturer ("OEM") device supplier to load a configured OS onto computing devices at the time they ship from the OEM. Therefore, the cumbersome task of individual computing device configuration falls to the enterprise. Multiplied by the number of employees in a workforce, the initial setup can be a major drain on company resources. These setup steps are repeated when a computing device malfunctions or is assigned to a new employee, or when an employee upgrades to a new device. This can be a major source of costs and delays within the enterprise.

Trusted boot processes are also fragmented across different providers of personal computer ("PC") devices. Secure boot is one such process supported by WINDOWS, using hash encryption to ensure a secure version of WINDOWS with a BIOS version is loaded on the computing device. Each provider can attempt to specify the BIOS and software versions. In the PC ecosystem, there is no single trusted source to cause computing devices to boot with the right OS and software configurations for different enterprises or groups.

In the fragmented PC ecosystem, recovering device configurations is also very difficult. Without the ownership or configuration details, it is generally not possible to provide a clean version of the OS, installed software, and drivers. Therefore, Internet recovery has been lacking for PC devices up to this point.

Consequently, a need exists for a system for provisionally enrolling computing devices for EMM operation on first boot. A need also exists for the computing devices to retrieve correct OS and application configurations, to attest that the correct configuration exists on subsequent boots, and to offer pre-OS recovery options.

SUMMARY

Examples described herein include systems and methods for bare metal device management. "Bare metal" refers to pre-OS operations that do not require an OS for support. In one example, a computing device includes firmware that is configured to contact a network address prior to booting a primary OS. The network address can be specified in a Unified Extensible Firmware Interface ("UEFI") or BIOS of the firmware. A management server associated with the network address can then supply a boot agent to the computing device. For example, this can be done as part of a hypertext transfer protocol ("HTTP") boot capability of UEFI. The boot agent can allow for a managed boot of an OS configuration that ensures the device has certain management capabilities upon startup.

The boot agent can be downloaded and added to a system partition of the computing device during the HTTP boot. The boot order can also be modified by the boot agent such that the boot agent executes before a primary OS boot manager during boot of the computing device. In one example, the boot agent disables other boot paths, such as UEFI paths, to ensure control over the boot process. The boot agent can be prioritized first in the boot order. The boot agent can include a system password for use in retrieving an OS configuration from the management server. The boot agent can then apply this OS configuration to the primary OS.

The original HTTP boot to the network location can be placed second in the boot order. If the boot agent fails to boot the computing device, the HTTP boot can retrieve a new boot agent from the network location and restart the boot process.

The boot agent can also cause the computing device to apply an OS configuration to the primary OS. The OS configuration can be specified by the management server and retrieved by or with the boot agent. To apply the OS configuration, the boot agent can execute a pre-OS environment downloaded from the management server. For purposes of this disclosure, the pre-OS environment can be considered part of the boot agent. The boot agent can retrieve one or more packages of drivers or software for insertion into the primary OS. A package can also include code for a management agent that executes after the primary OS boots. After the primary OS is configured, the computing device can boot the primary OS.

The management agent can ensure that the computing device is compliant with an EMM system after the computing device loads the primary OS. The management agent can report device information, such as hardware identifiers and application usage, to the management server of the EMM system. The management agent can also download a profile containing compliance rules. The management agent can ensure that the device is compliant with those rules. The management agent can set flags (i.e., variables) in the firmware to indicate that a compliance check failed, that the device is noncompliant, that the device has received a hardware or OS update, or that the device should be decommissioned.

On subsequent boot, the boot agent can check the flags in firmware set by the management agent and take various actions in response. In one example, the boot agent can perform OS attestation, confirming the primary OS has a configuration currently specified by a management server. In one example, this can be done if a flag indicates the computing device has been updated. In another example, OS attestation is performed by the boot agent on every subsequent boot.

In another example, the boot agent performs a health check by determining if the management agent has been successfully verifying compliance. To do this, the boot agent can check whether the last boot time is more recent than a last compliance check and, if so, can increment a counter. When the counter exceeds a threshold, the boot agent can download a new instance of itself and can boot from the new instance of the boot agent. The boot agent can download and apply the OS configuration, giving the computing device a fresh start.

The boot agent can also determine that a decommission flag was set by the management agent. Upon detecting the flag during the subsequent boot, the boot agent can load a pre-OS boot environment without the boot agent for performing a default boot sequence.

The examples summarized above can each be incorporated into a non-transitory, computer-readable medium having instructions that, when executed by a processor associated with a computing device, cause the processor to perform stages for managing firmware on a group of user devices enrolled in an EMM system. It can also be implemented in a system or as a method executed by one or more processors.

Both the foregoing general description and the following detailed description are exemplary and explanatory only and are not restrictive of the examples, as claimed.

DESCRIPTION OF THE EXAMPLES

Figure 1:
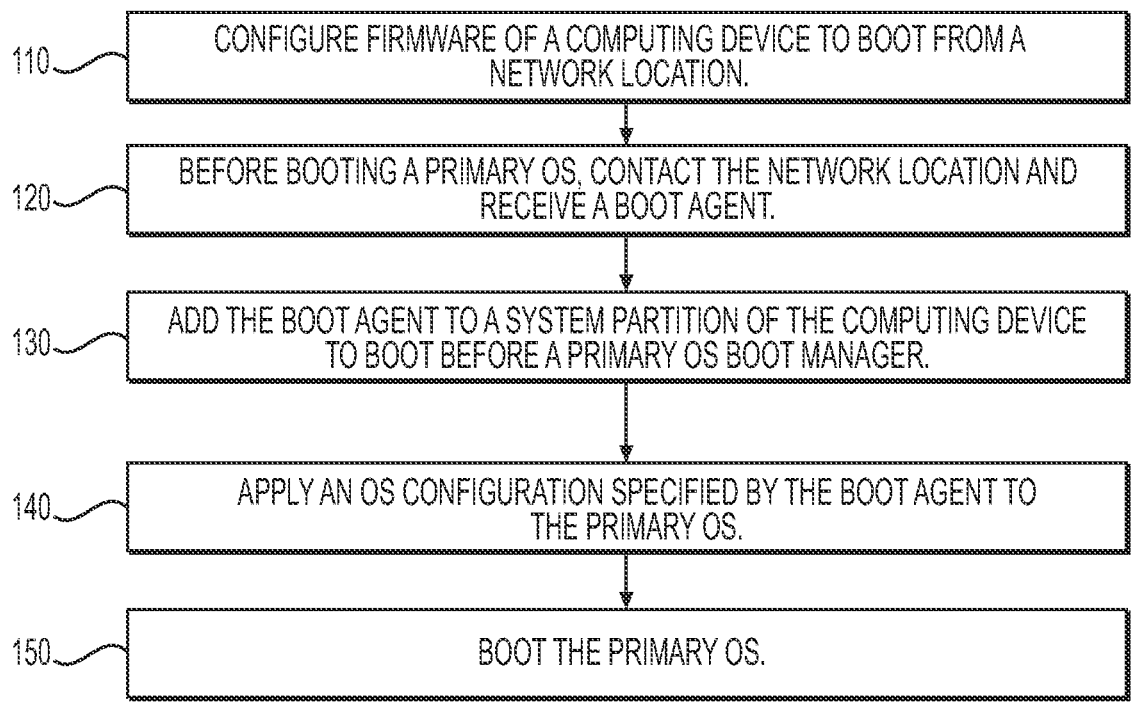
FIG. 1 is a flowchart of an exemplary method for bare metal device management.

Reference will now be made in detail to the present examples, including examples illustrated in the accompanying drawings. Wherever possible, the same reference numbers will be used throughout the drawings to refer to the same or like parts.

Examples described herein include systems and methods for bare metal management of devices. The system can include a management server that stores one or more boot agents for use by devices in configuring and booting an OS. Firmware of a computing device can be preconfigured to contact a network address, such as a uniform resource locator ("URL") upon boot. The URL can be an address for the management server. When the management server receives a request from the computing device, the management server can determine a boot agent and pre-OS boot environment to send to the computing device.

The boot agent can insert itself in an extensible firmware interface ("EFI") partition as the first entry in a boot order, before a primary OS boot manager that can exist on the device. The EFI partition can be a partition on a primary data storage device (e.g., hard-disk drive or solid-state drive) that is reserved for UEFI usage. The new boot order can cause the boot agent to execute first and control the boot process. The boot agent can be an EFI application that acts as a mini OS with a pre-OS environment. In one example, the boot agent can disable the primary OS boot manager and other boot paths. The pre-OS environment can be downloaded by the boot agent or by the initial HTTP boot. The management server can supply a pre-OS environment selected for compatibility with the computing device, in one example.

After the boot agent is added to the EFI partition, it can download an OS configuration for the computing device. This can be a package of code or other data that can be spliced into the primary OS. This can modify the primary OS to include management functionality used to manage the device, for example, as part of an EMM system. This can complete the provisioning of the computing device.

On reboot, the computing device can continue to use the boot agent first, before a primary OS boot manager, to ensure the OS configuration is compliant by checking with the management server. If the primary OS is not configured correctly, the boot agent can download the current configuration and can apply it to the primary OS.

The boot agent can also ensure that a management agent of an EMM system is running properly. A management server of an EMM system can utilize a management agent to control compliance at the computing device. The management agent can be installed as part of configuring the primary OS, in an example. For example, the management agent can be downloaded as part of the package.

To allow the boot agent to determine if the management agent functions properly, the management agent can report compliance checks to the firmware. On reboot, the boot agent can check the firmware to determine whether the compliance check was more recent than the last boot. If a threshold number of boots take place without a compliance check, the boot agent can initiate a recovery that can include installing the management agent as part of the primary OS.

Systems for bare metal device management can result in cost reduction, and can be utilized for computing devices with different hardware configurations. As described herein, in one example, bare metal device management can be performed as a cloud service—providing increased management capabilities over computing devices.

FIG. 1 is an example method for bare metal device management. At stage 110, the firmware of a computing device is configured to boot from a network location. This means that the computing device will attempt to contact the network location as part of its boot sequence. The network address can be specified in an UEFI or BIOS. Both types of firmware can perform similar functions and are the first code to run when the device is powered on. For the purposes of this disclosure, the terms BIOS, firmware, and UEFI can be used interchangeably. The fundamental purposes of the firmware include initializing and testing hardware components on the device and loading a primary OS. The firmware can perform boot services, runtime services, initialize hardware in the computing device, load the OS, and hand off the hardware components to the primary OS.

UEFI can include a WIFI stack and HTTP boot functionality. Before the primary OS loads, this can give UEFI limited functionality allowing connection to the Internet. HTTP boot can combine Dynamic Host Configuration Protocol ("DHCP"), Domain Name System ("DNS"), and HTTP to provide the capability for system deployment and configuration over a network. UEFI can have boot entries for one or more boot managers, including a primary OS boot manager responsible for loading the primary OS. The primary OS boot manager can be a UEFI application that runs while the UEFI boot services are available. Once the boot sequence is complete, boot services are exited. The primary OS typically is limited to accessing UEFI runtime services, such as shutdown and system time.

To configure the computing device to contact the network location as part of the boot sequence, an entry can be added to a UEFI table to contact the network location. The network location can be a URL. The boot sequence can be maintained in firmware, such as in non-volatile random-access memory ("NVRAM"). In one example, the firmware can initially be configured by the OEM of the computing device. For example, all computing devices being purchased by an enterprise or managed by an EMM can be preconfigured in firmware to contact the network location.

In one example, the boot order can also be changed to ensure that the network location is contacted prior to the primary OS boot manager executing. This can include updating the NVRAM so that an HTTP boot occurs using the network location prior to executing the primary boot manager.

At stage 120, the computing device contacts the network location. This can include requesting a boot agent. In one example, the network location can be a URL associated with a management server. The management server can receive the request and determine which boot agent to send to the computing device. The boot agent can be determined based on a primary OS or device identifier in one example.

The boot agent can include a pre-OS environment. The pre-OS environment can be based on WINDOWS or LINUX to provide a richer environment to perform activities like initial device provisioning, recovery, and decommissioning. The boot agent can act as a mini boot loader to determine what to boot next and which aspects of the pre-OS environment to execute based on the state of the computing device. In one example, the correct pre-OS environment can be selected from multiple different versions by the management server.

At stage 130, the computing device can install the boot agent to a system partition, such as the EFI partition. The boot agent or pre-OS environment can also update the firmware to execute the installed boot agent before the primary OS boot manager. For example, the boot agent can be configured as the first boot entry in a UEFI boot table. The installed boot agent can be the first entry. In an example, contacting the network location can be the second boot entry. Additionally, UEFI can be locked down to prevent other boot paths from taking precedence over those of the boot agent.

One role of the boot agent can be to initiate execution of the pre-OS environment. The pre-OS environment can be stored in random access memory ("RAM") of the computing device, in one example. Alternatively, it can be stored in primary device storage, such as a hard-disk drive or a solid-state drive. The purpose of the pre-OS environment can be to provide a richer platform OS configuration than is otherwise available in firmware (such as UEFI). This can effectively allow the boot agent to initiate functionality beyond what is available in the installed boot agent itself. The pre-OS environment can contain more lines of code than are available in firmware. It can also include platform functionality not available in firmware, such as support for an NTFS file system for provisioning WINDOWS. In an alternate example, a computing device with large firmware capability can store the pre-OS environment in firmware.

At stage 140, the computing device can apply an OS configuration to the primary OS. The OS configuration can be specified by the management server. For example, the pre-OS environment or boot agent can contact the management server to authenticate the user of the computing device. The user can be the actual user or a system user. In one example, the user is prompted to login before the OS starts up, and this login information is used by the boot agent in communicating with the management server to configure the OS. In another example, the boot agent includes a system password that is supplied to the management server. This can allow the management server to authenticate the device without prompting from the user for first-time provisioning.

Based on the user or a device identifier, the management server can retrieve an OS configuration or identify an OS configuration for retrieval from another network address. The OS configuration can include a package of drivers, OS code changes or additions, and applications. The management server can specify the package for download by including it in the OS configuration or including a network address for the boot agent to contact. In one example, the management server supplies the OS configuration as part of the pre-OS environment. In another example, the OS configuration is downloaded separately during execution of the pre-OS environment by the boot agent.

The OS configuration can include or identify packages of device drivers and applications for use at the computing device. These packages can be statically included with the OS configuration or, alternatively, dynamically injected, such as by contacting one or more configuration servers associated with various hardware components on the computing device. To download individual drivers, hardware identifiers can be supplied by the boot agent to one or more configuration servers, which identify the appropriate drivers. The boot agent can then download the appropriate drivers from the configuration servers.

The boot agent can use the pre-OS environment to apply the OS configuration to the primary OS. This can include injecting the package at one or more locations of the primary OS. In one example, the primary OS is permanently modified. In another example, the code injection occurs each time the primary OS boots without permanently modifying the stored version of the primary OS on the computing device.

The OS configuration can also include a management agent used in an EMM system. The management agent can be part of the primary OS or an application executed by the primary OS. The management agent can contact the management server during operation of the computing device, after boot is complete. The management agent can supply device information to the management server for use in determining if the device complies with EMM compliance rules. The management agent can lock certain device functionality to ensure security, for example, when the computing device is accessing enterprise data. The management agent can allow the management server to perform tasks such as installing managed applications or wiping enterprise data when the device is noncompliant. As will be described later, the management agent can operate differently depending on profiles defined at the management server for managing a device.

At stage 150, the primary OS loads. In one example, after the boot agent completes its execution, the primary OS boot manager executes and loads the primary OS, including the configuration applied by the pre-OS environment. This can end the boot sequence. From there, the computing device can operate according to the configuration applied to the primary OS, including management agent functionality.

Figure 2:
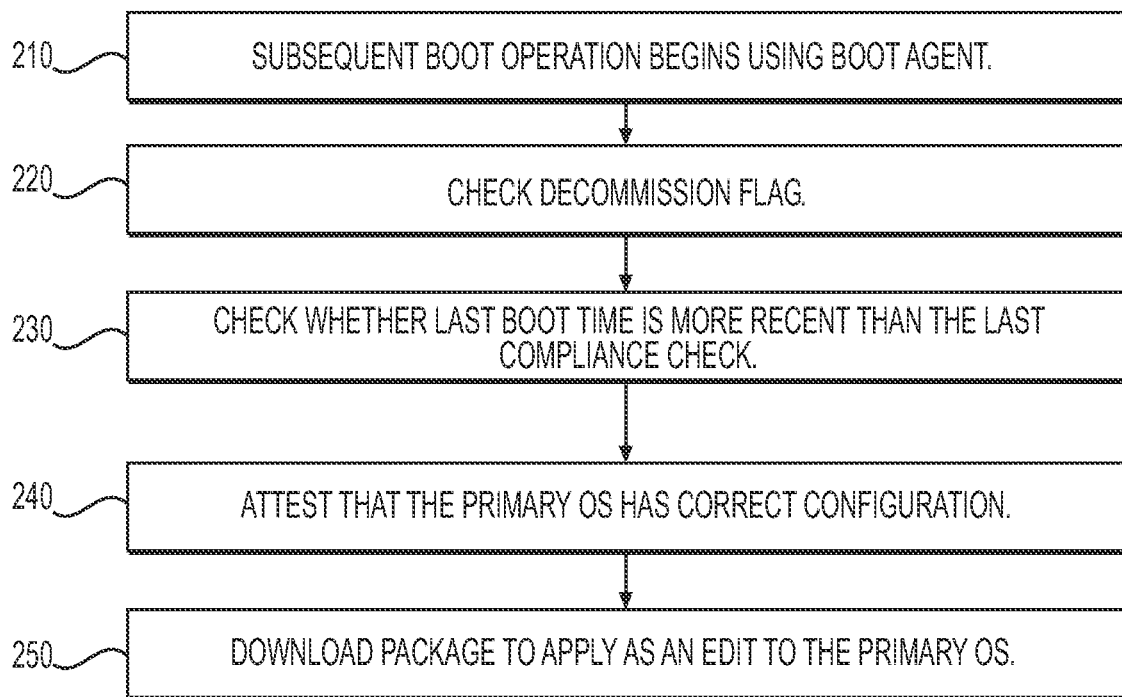
FIG. 2 is a flowchart of an exemplary method for bare metal device management.

FIG. 2 is an exemplary method for subsequent boots. At stage 210, the computing device begins a subsequent boot operation. Based on the stages of FIG. 1, the boot agent is already installed in the system partition. In one example, the boot agent executes the pre-OS environment to perform one or more functions. For the purposes of this disclosure, the boot agent functions include those executed by the pre-OS environment.

At stage 220, the boot agent can check a decommission flag in the firmware to determine whether the device should be decommissioned prior to loading the primary OS with configurations. The decommission flag can be set by the management agent. For example, if the management agent determines that the computing device is noncompliant, it can set the decommission flag. The decommissioning can also be initiated by an administrator of the EMM system. As an example, if an employee leaves the organization or their device is lost or stolen, the administrator can use a console application of the management server to select the computing device for decommissioning. Then, when the management agent or boot agent contacts the management server, the management server can send a message that causes the management agent or boot agent to set the decommission flag.

In one example, after the management agent receives the decommission instruction from the management server and sets the decommission flag, it initiates reboot. During the reboot, the boot agent determines the decommission flag is set. In response, the boot agent can load the pre-OS environment and can perform a secure wipe of the primary device storage. The boot agent (itself or through the pre-OS environment) can reset the UEFI to default settings, including resetting the boot order. As a result, a non-configured version of the primary OS can be booted by the primary OS boot manager. The boot agent can delete itself from the system partition and can delete the pre-OS environment, in an example. As a result, the computing device can then boot in a default state without access to enterprise data.

At stage 230, the boot agent can determine whether the management agent is performing compliance checks. As will be described below, the management agent can update a variable in firmware to store the last time a compliance check occurred. The boot agent can compare that time of last compliance check against a different NVRAM variable that stores the last boot time. If the last boot time is more recent than the last compliance check, this can indicate that the management agent did not verify compliance with the management server during the last operation of the computing device. The boot agent can update the firmware to track how many boots have gone by since the last compliance check. If a threshold number is exceeded, then the boot agent can initiate a recovery sequence. This can include downloading the pre-OS environment and OS configuration from the management server or cloud.

At stage 240, the boot agent can perform OS attestation by checking with the management server to determine that the primary OS has the correct configuration. This can include contacting the management server to ensure the correct OS configuration is applied. In one example, the management server can have a configuration identifier that the boot agent compares against a firmware variable reflecting the same. In another example, a configuration date is compared against a date of the current configuration. The boot agent can ensure the computing device does not boot unless it has the correct OS configuration. As discussed below, the computing device can check device health (compliance) and decommissioning, and can perform recovery as needed.

The management server can specify new configurations from time to time, such as when software, driver, or OS updates occur. If the computing device does not have the correct OS configuration, then at stage 250 the boot agent (including pre-OS environment) can download the new OS configuration and can apply it to the primary OS before loading the primary OS. In one example, the boot agent can download the new OS configuration at stage 250 any time the management server updates the configuration for the computing device.

If the boot agent can attest that the computing device has the correct OS configuration, is in good health (compliance), and is not set to be decommissioned, the boot agent can load the primary OS.

Figure 3:
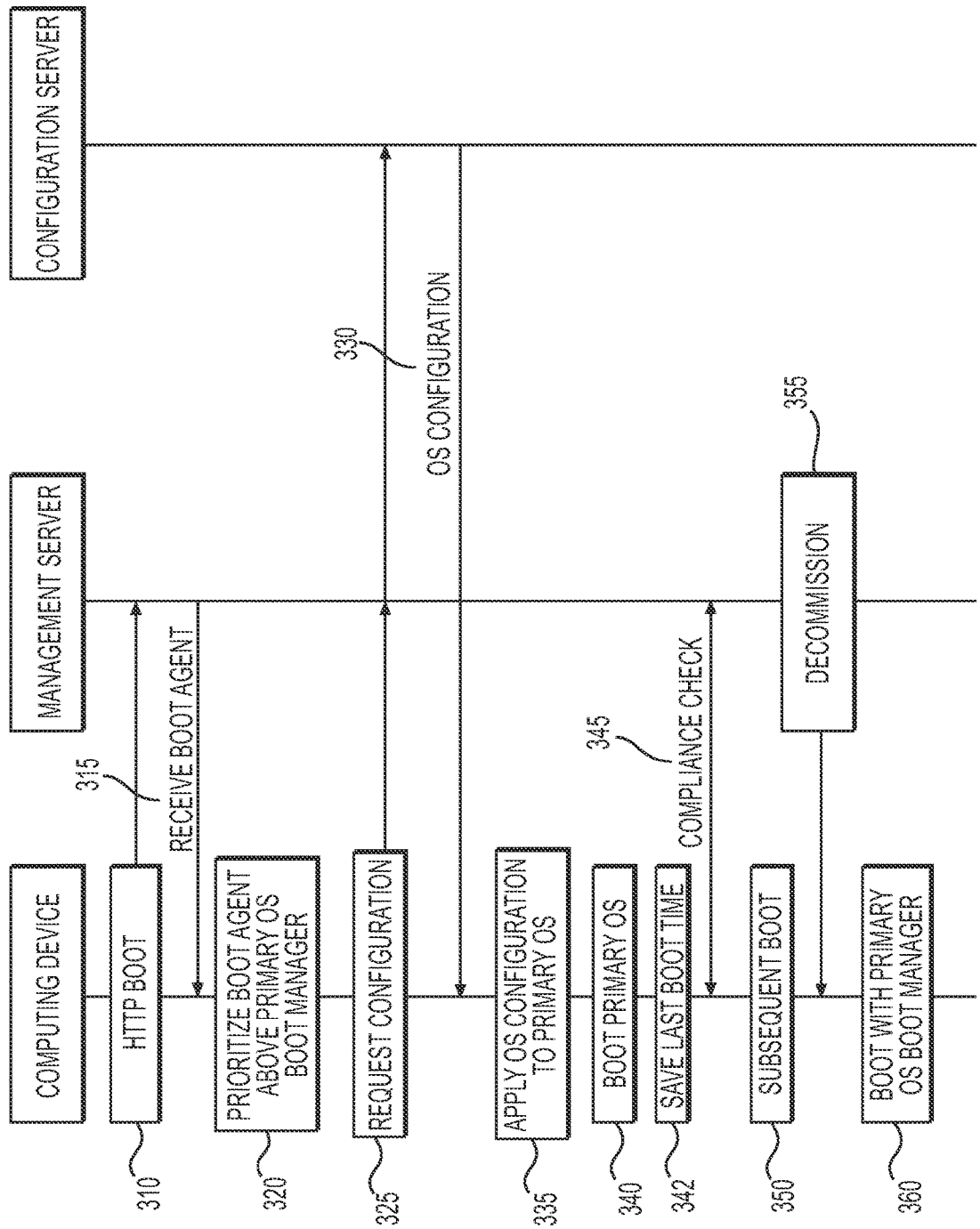
FIG. 3 is an exemplary sequence diagram for bare metal device management.

FIG. 3 is an exemplary sequence diagram. At stage 310, the computing device boots from a network address. The computing device can be configured to perform an HTTP boot in one example. For example, the NVRAM portion of firmware can be preconfigured to contact a URL or other network location. The URL can correspond to the management server. The management server can be one or more servers including one or more processors. In one example, a first server manages OS configurations and boot agents and a second server manages compliance and management agent function calls.

The management server can receive contact from the computing device and can determine which boot agent and pre-OS environment to supply. The firmware can be configured with part of the boot agent that negotiates this exchange with the management server. The computing device can supply ownership or device information to the management server. The management server can then supply an expanded boot agent at stage 315. In some examples, the expanded boot agent can include the pre-OS environment.

At stage 320, the computing device can configure the boot agent received from the management server to boot before a primary OS manager. In one example, this can include updating a UEFI table in firmware to list the boot agent as the first entry. The HTTP boot can be listed as a second entry in one example, in case the boot agent fails to boot. Additionally, other boot paths can be locked or removed such that the primary boot manager does not cause the computing device to boot into the primary OS before the configuration is verified or applied.

At stage 325, the computing device can request an OS configuration from the management server. The request can be sent to the same server as in stage 310 or to a different server. In one example, the management server can forward the request to a configuration server.

Either a device identifier or ownership identifier provided from the computing device can be used to determine which OS configuration to retrieve. The identifier can be preconfigured in firmware, such as by an OEM, in an example. Alternatively, it can be downloaded as part of the boot agent at stage 315.

At stage 330, the management server or configuration server can supply the OS configuration. The OS configuration can include at least one package to apply to the primary OS. A package can include drivers, code related to the management agent, and managed applications. In one example, stage 330 is performed as part of stage 315. For example, the OS configuration can be supplied as part of a pre-OS environment.

At stage 335, the computing device can apply the OS configuration to the primary OS. In one example, the package can be injected into the primary OS. The code in the package can supplement or replace the default primary OS code. In another example, the OS configuration can specify various URLs or other network locations for the computing device to download packages, such as particular drivers or applications. These downloaded packages can be added to the primary OS.

Once the primary OS is configured, at stage 340 the computing device can boot the primary OS. The boot agent can also store the last boot time in firmware at stage 342. This can include recording the current time and date in an NVRAM variable.

The primary OS, as configured by the management server, can include a management agent that communicates with the management server. At stage 345 the management agent can perform a compliance check of the computing device. This can include contacting the management server and supplying device information to compare against compliance rules or receiving the compliance rules to apply to device information. The compliance rules can be specific to the computing device or to a group, such an organizational group, to which the computing device is associated.

The compliance rules can include blacklisted processes or applications that cannot execute while other managed processes operate or cannot execute on the device at all. Other compliance rule examples include whether the OS is modified (rooted or jailbroken), whether the management agent is removed or modified, whether a profile used by the management agent is missing, and whether disallowed application settings are enabled. Other compliance violations can include invalid user credentials, an expired certificate, credentials that do not meet security requirements, geofence violations, or the use of unsecure communication channels for a service requiring secure communication. The examples herein also apply to any other additional compliance rules not specifically enumerated.

The EMM provider can use the management agent by making API calls to the OS or by causing a messaging server to do so. As an example, GOOGLE can provide enterprise support services through its ANDRIOD operating system (the services sometimes referred to as ANDRIOD FOR WORK). In one example, the management agent can be modified by the OS configuration or a profile can be added as part of the OS configuration.

The management agent can read the profile to block the computing device from functionality that is unauthorized by the management server, in one example. The profile for a first computing device can be different than profiles of other enrolled computing devices. The profile can include drivers, software, or OS packages for installation. The configuration specified for a user device can be based on one or more of the ownership of the computing device, device characteristics such as primary OS and installed hardware, or organizational group of the computing device.

When the device is noncompliant, the management agent can take various actions. The action can depend on the compliance violation and can be specified as part of the compliance rules. In one example, the management agent stores a value in firmware indicating the device is noncompliant. The boot agent can recognize the value on a subsequent boot at stage 350 and download a new OS configuration to make the device compliant.

In one example, the management server can decommission the computing device at stage 355. The management server can do this based on noncompliance in one example. Alternatively, an administrator can use a console to select the computing device for decommissioning. This can be useful when an employee leaves an organization or when the computing device is lost or stolen. The management agent can set a decommission flag in firmware so that the boot agent causes the device to wipe enterprise data or the primary storage and restore to a default state on subsequent boot at stage 350.

On subsequent boot at stage 350, the boot agent can execute first and check for various firmware values as described in FIG. 2. Once the checks of FIG. 2 are complete, the computing device can boot the primary OS at stage 360. This can include using the primary OS boot manager in one example.

Figure 4A:
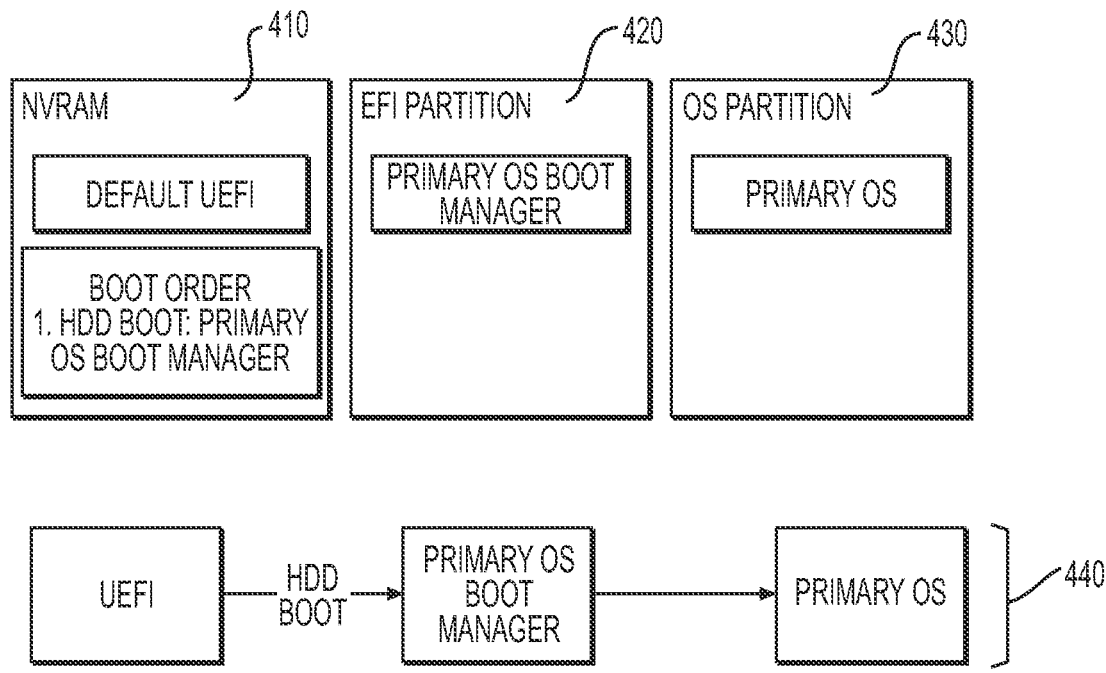
FIG. 4A is an exemplary illustration of system components for a managed boot operation.
Figure 4B:
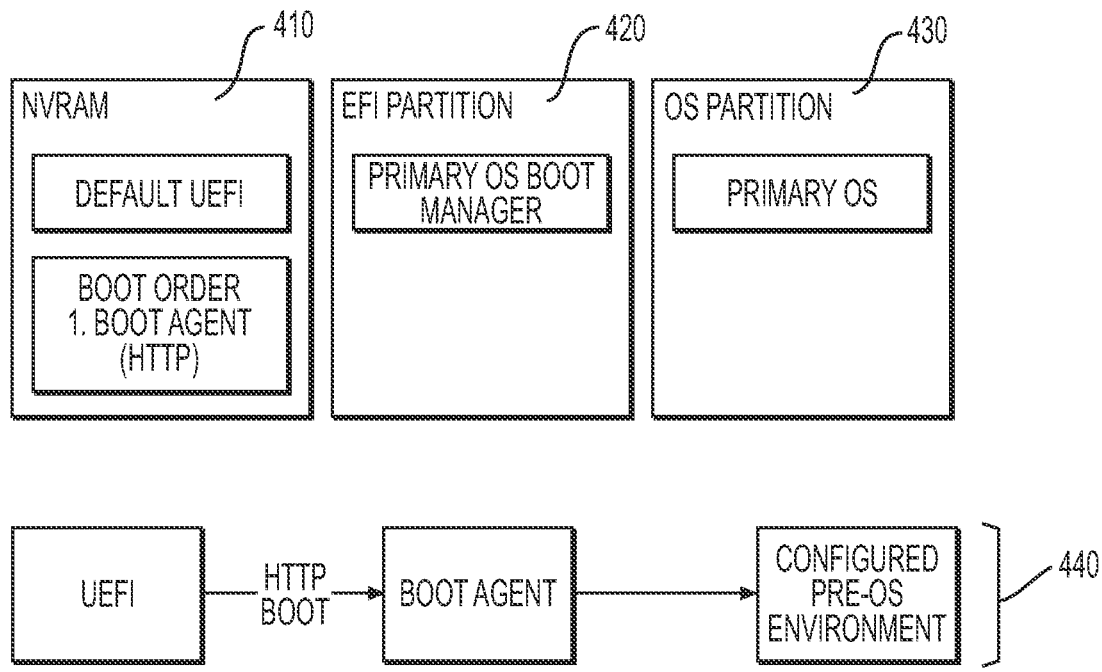
FIG. 4B is an exemplary illustration of system components for a managed boot operation.
Figure 4C:
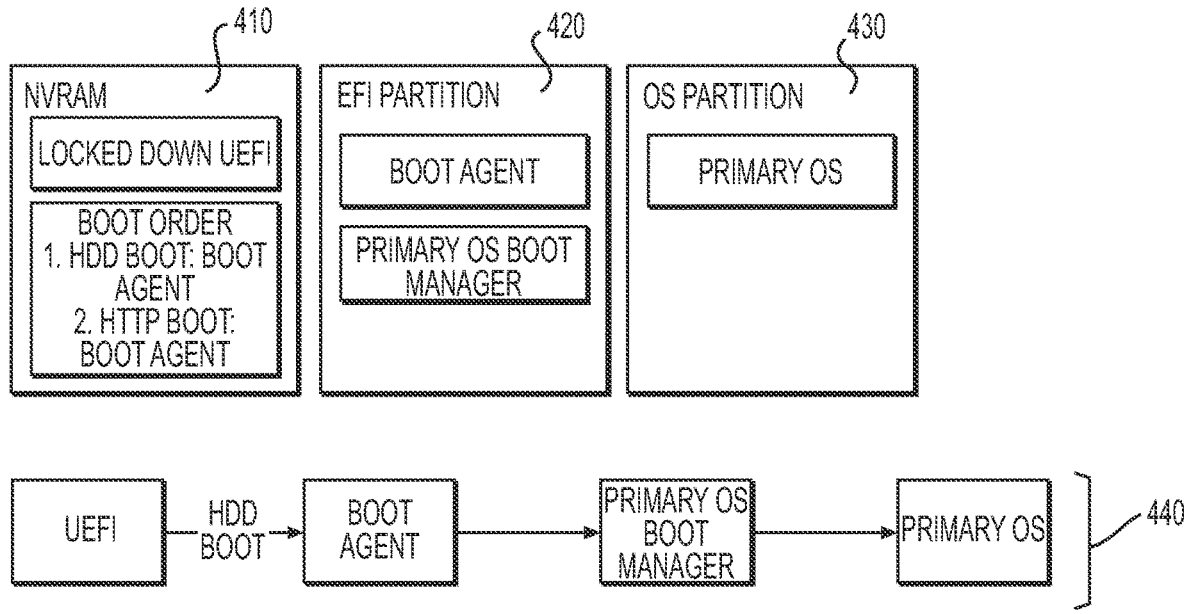
FIG. 4C is an exemplary illustration of system components for a managed boot operation.

FIGS. 4A-4C are example illustrations of system components at various stages of booting the computing device. Each drawing illustrates contents of NVRAM 410, an EFI partition 420, and an OS partition 430. NVRAM 410 can store the boot order and various flags (i.e., variables) used during boot. The EFI partition 420 can be a portion of a primary storage device, such as a hard drive or solid-state drive. It can store the pre-OS environment and other executable code for use during boot, such as the boot agent and the primary OS boot manager. The OS partition 430 can include the operating system itself, including the primary OS and any secondary OS. Each of FIGS. 4A-4C also includes a boot sequence 440 to illustrate how the computing device will boot based on the current states of the NVRAM 410, EFI partition 420, and OS partition 430.

Turning to FIG. 4A, a default boot condition is presented. The NVRAM 410 can include default UEFI information for booting the computing device into a WINDOWS or LINUX OS, for example. The boot order used by UEFI can list a primary OS boot manager as the top boot priority. In this default condition, the boot sequence 440 includes UEFI that would cause the primary OS boot manager to boot the primary OS.

Turning to FIG. 4B, the NVRAM 410 is configured to instead boot from a network location. This can include preconfiguring the NVRAM 410 to contact a network location that supplies the boot agent. The boot order can reflect first reflect an HTTP boot of the boot agent at the network location. At this stage, the boot agent may not have been stored in the EFI partition 420. Instead, it is retrieved from the network location. Therefore, the boot sequence 440 can include using UEFI to perform an HTTP boot by contacting the network location to receive the boot agent and the pre-OS environment.

In FIG. 4C, the boot order can be changed in the NVRAM 410 based on the boot agent downloaded from the network location. As shown, the boot agent can be stored in the EFI partition 420. It can also be first in the boot order in NVRAM 410. This can cause the computing device to boot using the boot agent stored locally on the computing device. If boot fails, then the computing device can attempt an HTTP boot to retrieve an updated boot agent.

This can result in a boot sequence 440 of UEFI causing a hard-disk drive boot using the boot agent. After the boot agent has handled its various OS configuration, compliance, and decommissioning determinations, the primary OS boot manager can boot the primary OS. The primary OS boots as previously configured by the boot agent (including pre-OS environment).

Figure 5A:
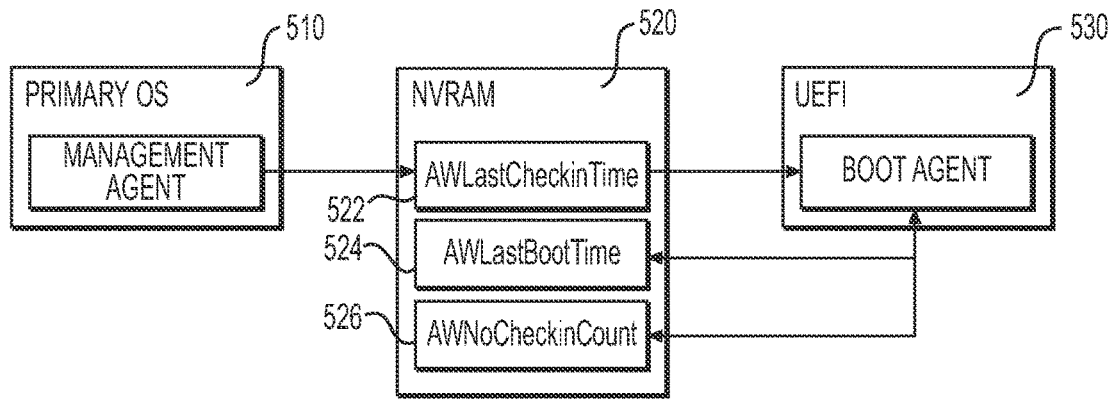
FIG. 5A is an exemplary illustration of system components for device health, compliance, and boot recovery.

FIG. 5A is an exemplary illustration of system components used in system recovery. The primary OS 510 can operate as part of normal device usage. The management agent can execute as part of the primary OS 510 based on configurations previously applied by the pre-OS environment and boot agent. The management agent can check compliance with the management server. If the compliance check is successful, the management agent can store the check-in time in NVRAM 520. The check-in time can include a date and time. It can be a datetime value in one example. In this example, the check-in time can be stored in a variable called AWLastCheckInTime 522.

On a subsequent boot, UEFI 530 can cause the boot agent to execute. The boot agent can retrieve the check-in time from the AWLastCheckInTime variable 422 in NVRAM 520. The boot agent can also retrieve the last boot time, which can reflect a date and time that the computing device last booted. By comparing the check-in time to the last boot time, the boot agent can determine whether a compliance check was completed during last operation.

In one example, the last boot time is stored in NVRAM 520 in the AWLastBootTime variable 524. The management agent can store this value upon execution immediately following a successful boot. Alternatively, the boot agent stores this value upon successful execution prior to completing loading of the primary OS. The boot agent can store the last boot time at the end of its boot operations to ensure the boot was successful before indicating a last boot time.

In one example, the boot agent increments a counter 526 to reflect each time the computing device boots without a compliance check having been performed since the last boot time. The counter can be incremented at the end of the boot operations performed by the boot agent to avoid false counts for unsuccessful boots.

If the counter increments above a threshold value, then the boot agent can initiate a recovery sequence. The recovery sequence can include an HTTP boot that causes the boot agent and pre-OS environment to be downloaded to the computing device. In another example, the boot agent attempts to retrieve a new OS configuration from the management server for application to the primary OS prior to loading the primary OS.

Figure 5B:
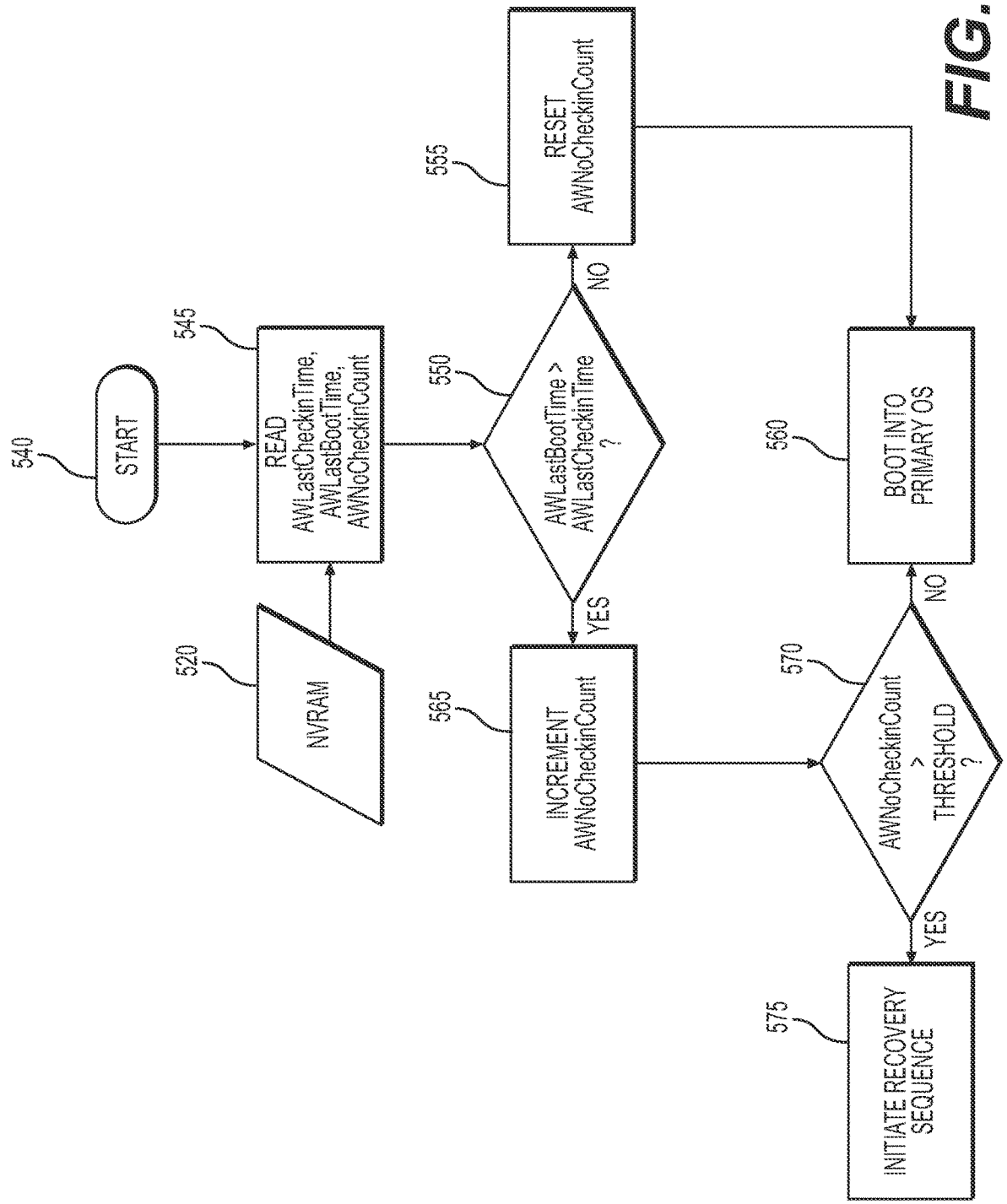
FIG. 5B is a flowchart of an exemplary method for device health, compliance, and boot recovery.

FIG. 5B is an example flowchart for determining whether to initiate recovery. At stage 540, the boot agent begins its determination of whether recovery is needed, prior to loading the primary OS. This can occur on a subsequent boot after the boot agent is installed and checking various flags set by the boot agent and management agent.

At stage 545, the boot agent reads the check-in time, last boot time, and counter described for FIG. 5A. These variables can all be stored and read from NVRAM 520. At stage 550, if the last boot time is prior to than the last check-in time, this indicates the computing device is successfully compliance checking. If instead the last boot time is greater than the last check-in time, this indicates that the computing device did not complete a compliance check after booting previously. If the compliance check did not occur, the boot agent can cause the device to take particular actions. In one example, the boot agent can check the OS configuration at the management server to verify the computing device is up to date.

Alternatively, the action taken can depend on a counter that indicates how many times in a row the computing device has booted without a compliance check. The counter can be reset at stage 555 when the check-in time indicates the device has successfully compliance checked since last boot. In that instance, the boot agent can set the counter in the firmware back to zero at stage 555.

In another example, the boot agent will continue to boot normally unless the counter indicates multiple boots in a row without a successful compliance check. To track the number of boots since the last compliance check, at stage 565 the boot agent can increment the counter. Each time the boot agent detects the computing device did not complete a compliance check since last boot, the counter can be incremented. Again, once a successful compliance check is indicated by the check-in versus last boot comparison, the counter is reset at stage 555.

At stage 570, the boot agent can compare the counter against a threshold to determine if too many boots have occurred without a compliance check. If not, then at stage 560 the boot agent or primary OS boot manager can load the primary OS. This can allow the computing device to start up. At that time or once the computing device has gained an Internet connection, the management agent can attempt a compliance check by contacting the management server.

Alternatively, if the counter has exceeded the threshold, then the boot agent can initiate a recovery sequence at stage 575. To initiate recovery, the installed boot agent can contact the network address and download a pre-OS environment and OS configuration. The pre-OS environment and OS configuration can be the latest available for the computing device. Alternatively, it can be a special pre-OS environment and OS configuration intended specifically for recovery situations. For example, it can include a managed safe mode with fewer drivers and less software activated than normal. Then, if compliance is successful, on the subsequent boot the boot agent can request and receive a pre-OS environment and OS configuration for normal managed operation. If the boot agent fails to contact the network address or is not able to perform the recovery sequence, then the computing device can perform an HTTP boot and receive a new boot agent. The boot agent can continue recovery from the cloud.

Figure 6:
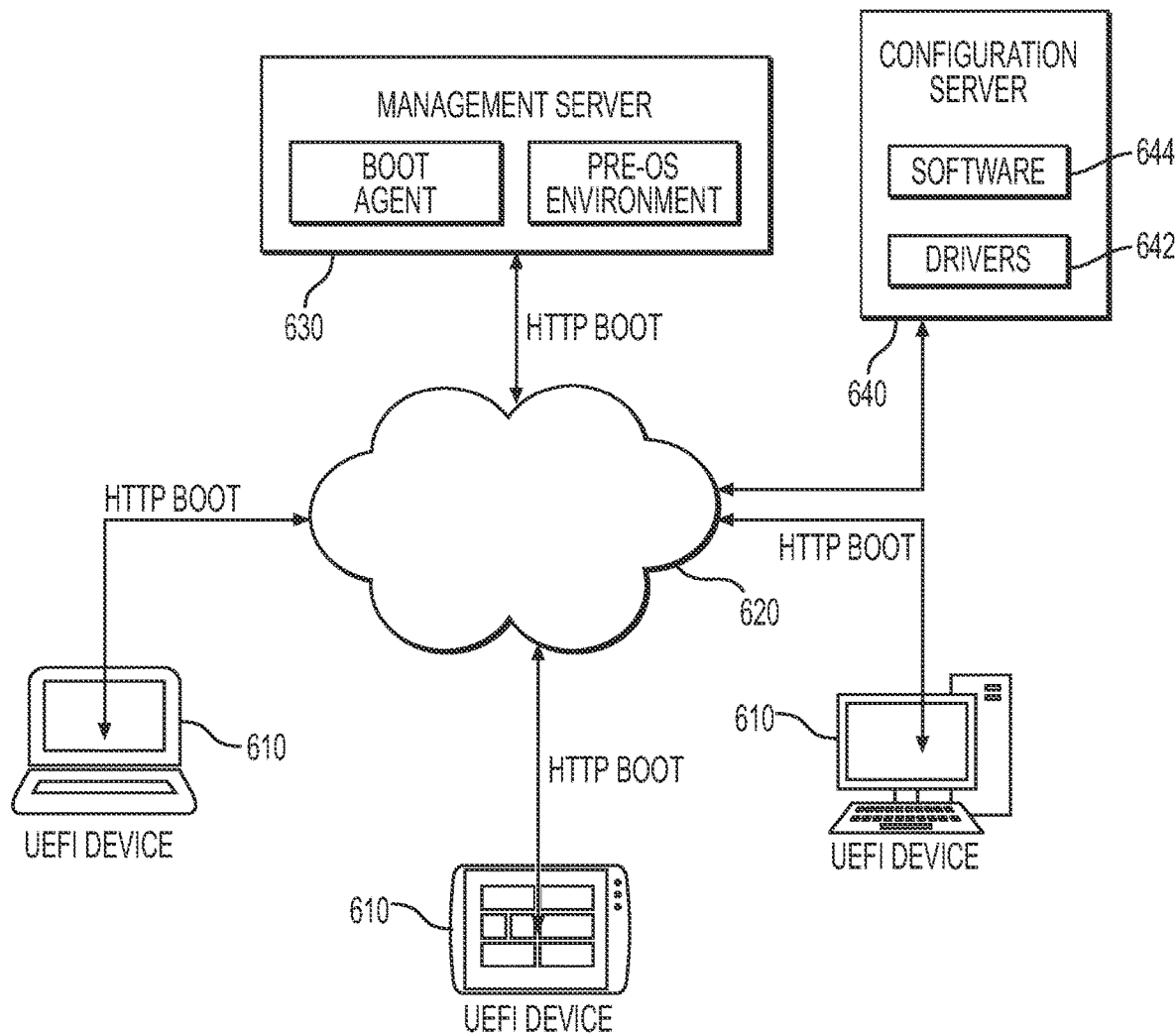
FIG. 6 is an exemplary illustration of system components for bare metal device management.

FIG. 6 is an exemplary diagram of system components. As shown, multiple computing devices 610 can connect to a management server 630 as part of the bare metal device management. The computing device 610 can connect to the management server 630 over a network 620, such as the internet.

The computing device 610 can be any processor-enabled device, such as a laptop, tablet, cell phone, or personal computer. The computing device 610 can include firmware for initiating a boot sequence of an OS. The firmware can run UEFI in one example. The UEFI can include a boot order that prioritizes an HTTP boot to a network location affiliated with the management server 630. However, this disclosure also applies to non-UEFI examples.

The management server 630 can be one or more servers having one or more processors. In one example, multiple servers of the management server 630 are affiliated with different network locations for handling different types or models of computing devices. In one example, the management server 630 can store one or more boot agents to supply to the computing devices 610. The boot agents can execute pre-OS environments that also are downloaded from the management server 630. The pre-OS environment can include various executables for applying OS configurations to a primary OS of the computing devices 610.

The management server can supply different pre-OS environments to the computing devices 610 based on the primary OS available on each computing device 610. In one example, the request from the computing device 610 to the network location indicates the OS type. Alternatively, the management server 630 can keep a table of device identifiers that correlate to a known primary OS on the computing device 610. The management server 630 can receive initial data regarding hardware and software builds for the computing devices 610 from an OEM in one example. In another example, as hardware and even OS versions are updated on the computing devices 610, the management agent can report the changes to the management server, which can update its records accordingly.

In one example, one or more configuration servers 640 supply packages containing drivers 642 and software 644 implicated by the OS configuration. A configuration server 640 can be part of the management server 630. A configuration server can also be separate from a management server 630 and maintained by a third party, such as a manufacturer of a hardware component within the computing device 610 or of the computing device 610 itself. The OS configuration can indicate various URLs or other address for software 644 and drivers 622 needed for the computing device 610. In one example, the boot agent contacts the configuration servers 640 at URLs indicated in the OS configuration, downloads the packages, and applies them to the primary OS as specified by the OS configuration received from the management server 630. Alternatively, the management server 630 can contact the configuration servers 640 and supply the packages as part of the OS configuration to the computing device 610.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for bare metal device management, comprising:
   configuring, by a computing device, a boot agent to execute before a primary operating system ("OS") boot manager during boot of the computing device, wherein the computing device has at least one physical processor;
   applying, by the computing device, an OS configuration to the primary OS, the OS configuration being specified by a management server; and
   when at least one boot has occurred since the computing device performed a compliance check with the management server, downloading a new boot agent and booting the primary OS on the computing device using the new boot agent;
   incrementing a counter in firmware of the computing device to indicate a number of boots that have occurred since the compliance check; and
   resetting the counter after the compliance check.

2. The method of claim 1, further comprising:
   storing a first date of a preceding successful boot in firmware of the computing device;
   comparing the first date to a second date that indicates a prior compliance check; and
   in response to the comparison, downloading the new boot agent when the first date is greater than the second date.

3. The method of claim 1, further comprising:
   retrieving, from firmware of the computing device, a network location;
   before permitting the primary OS to boot, contacting the network location and receiving the boot agent; and
   adding, by the computing device, the boot agent to a system partition of the computing device.

4. The method of claim 1, further comprising:
   during booting from the new boot agent, confirming that the primary OS has the OS configuration specified by the management server.

5. The method of claim 1, further comprising:
   saving a last boot time to the firmware;
   in an instance in which the last boot time is more recent than a last compliance check from a management server, incrementing a counter; and
   in an instance in which the counter exceeds a threshold, downloading the new instance of the boot agent.

6. The method of claim 5, further comprising:
   in an instance in which the counter is less than a threshold, booting the primary OS as currently configured.

7. The method of claim 1, further comprising:
   receiving a decommissioning message from the management server;
   storing a flag in the firmware; and
   upon detecting the flag during a subsequent boot, loading a pre-OS boot environment without the boot agent for performing a default boot sequence.

8. A non-transitory, computer-readable medium comprising instructions that, when executed by a processor, perform stages for bare metal device management, the stages comprising:
   configuring, by a computing device, a boot agent to execute before a primary operating system ("OS") boot manager during boot of the computing device, wherein the computing device has at least one physical processor;
   applying, by the computing device, an OS configuration to the primary OS, the OS configuration being specified by a management server; and
   when at least one boot has occurred since the computing device performed a compliance check with the management server, downloading a new boot agent and booting the primary OS on the computing device using the new boot agent;
   receiving a decommissioning message from the management server;
   storing a flag in the firmware; and
   upon detecting the flag during a subsequent boot, loading a pre-OS boot environment without the boot agent for performing a default boot sequence.

9. The non-transitory, computer-readable medium of claim 8, the stages further comprising:
   incrementing a counter in firmware of the computing device to indicate a number of boots that have occurred since the compliance check; and
   resetting the counter after the compliance check.

10. The non-transitory, computer-readable medium of claim 8, the stages further comprising:
    storing a first date of a preceding successful boot in firmware of the computing device;
    comparing the first date to a second date that indicates a prior compliance check; and
    downloading the new boot agent when the first date is greater than the second date.

11. The non-transitory, computer-readable medium of claim 8, the stages further comprising:
    retrieving, from firmware of the computing device, a network location;

before permitting the primary OS to boot, contacting the network location and receiving the boot agent; and adding, by the computing device, the boot agent to a system partition of the computing device.

12. The non-transitory, computer-readable medium of claim 8, the stages further comprising:

during booting from the new boot agent, confirming that the primary OS has the OS configuration specified by the management server.

13. The non-transitory, computer-readable medium of claim 8, the stages further comprising:

saving a last boot time to the firmware;

in an instance in which the last boot time is more recent than a last compliance check from a management server, incrementing a counter; and in an instance in which the counter exceeds a threshold, downloading the new instance of the boot agent.

14. The non-transitory, computer-readable medium of claim 13, the stages further comprising:

in an instance in which the counter is less than a threshold, booting the primary OS as currently configured.

15. A computing device that performs bare metal device management, comprising:

a physical memory storage including a non-transitory, computer-readable medium comprising instructions; and a processor that executes the instructions to carry out stages comprising:

configuring a boot agent to execute before a primary operating system ("OS") boot manager during boot of the computing device;

applying an OS configuration to the primary OS, the OS configuration being specified by a management server;

when at least one boot has occurred since the computing device performed a compliance check with the management server, downloading a new boot agent and booting the primary OS on the computing device using the new boot agent;

incrementing a counter in firmware of the computing device to indicate a number of boots that have occurred since the compliance check; and resetting the counter after the compliance check.

16. The computing device of claim 15, the stages further comprising:

storing a first date of a preceding successful boot in firmware of the computing device;

comparing the first date to a second date that indicates a prior compliance check; and downloading the new boot agent when the first date is greater than the second date.

17. The computing device of claim 15, the stages further comprising:

retrieving, from firmware of the computing device, a network location;

before permitting the primary OS to boot, contacting the network location and receiving the boot agent; and adding, by the computing device, the boot agent to a system partition of the computing device.

\* \* \* \* \*